(12) United States Patent
Chung

(10) Patent No.: US 9,661,116 B1
(45) Date of Patent: May 23, 2017

(54) CARD-RECEPTIBLE SEMIAUTOMATIC SLIDE CASE FOR MOBILE PHONE

(71) Applicant: ISPEAKER CO., LTD., Goyang-Si, Gyeonggi-Do (KR)

(72) Inventor: Young Suk Chung, Goyang-Si (KR)

(73) Assignee: ISPEAKER CO., LTD. (KR)

( * ) Notice: Subject to any disclaimer, the term of this patent is extended or adjusted under 35 U.S.C. 154(b) by 0 days.

(21) Appl. No.: 15/213,378

(22) Filed: Jul. 18, 2016

(30) Foreign Application Priority Data

Jun. 23, 2016 (KR) .................. 20-2016-0003580 U

(51) Int. Cl.
| | | |
|---|---|---|
| *H04M 1/21* | (2006.01) | |
| *H04M 1/18* | (2006.01) | |
| *A45C 11/18* | (2006.01) | |
| *A45C 11/00* | (2006.01) | |

(52) U.S. Cl.
CPC ............... *H04M 1/21* (2013.01); *A45C 11/00* (2013.01); *A45C 11/182* (2013.01); *H04M 1/18* (2013.01); *A45C 2011/002* (2013.01)

(58) Field of Classification Search
CPC H04M 1/21; H04M 1/18; A45C 11/00; A45C 11/182
See application file for complete search history.

(56) References Cited

U.S. PATENT DOCUMENTS

| | | | | | |
|---|---|---|---|---|---|
| 5,850,440 | A | * | 12/1998 | Hannon | H04M 1/06 379/446 |
| 6,910,624 | B1 | * | 6/2005 | Natsuno | G06K 1/125 235/379 |
| 8,050,726 | B2 | * | 11/2011 | Chung | H04M 1/0237 379/428.01 |
| 8,213,181 | B2 | * | 7/2012 | Grant | F16H 25/183 361/730 |
| 8,811,604 | B2 | * | 8/2014 | Chen | H04M 1/0235 379/433.12 |
| 2005/0047589 | A1 | * | 3/2005 | Chang | H04M 1/0283 379/452 |
| 2006/0211459 | A1 | * | 9/2006 | Kubo | G06F 1/1616 455/575.4 |
| 2008/0101787 | A1 | * | 5/2008 | Kuo | H04N 1/00241 396/310 |
| 2008/0167098 | A1 | * | 7/2008 | Mizuta | H04M 1/0237 455/575.4 |
| 2008/0318645 | A1 | * | 12/2008 | Takamori | H04M 1/0233 455/575.4 |
| 2010/0160009 | A1 | * | 6/2010 | Tang | H04M 1/0227 455/575.4 |
| 2011/0086683 | A1 | * | 4/2011 | Kfoury | G06F 1/1624 455/575.4 |
| 2011/0292576 | A1 | * | 12/2011 | Liang | H04M 1/0227 361/679.01 |
| 2013/0015081 | A1 | * | 1/2013 | Wu | A45C 11/00 206/216 |
| 2013/0303007 | A1 | * | 11/2013 | Kim | H01R 13/447 439/135 |

(Continued)

*Primary Examiner* — Lewis West

(74) *Attorney, Agent, or Firm* — Renaissance IP Law Group LLP

(57) ABSTRACT

The present disclosure relates to a semiautomatic slide case for a mobile phone, which is capable of being semi-automatically slid by applying a slidable hook to a card-receptible mobile phone slide case to open and close a card receiving space.

5 Claims, 5 Drawing Sheets

(56) References Cited

U.S. PATENT DOCUMENTS

2015/0365122 A1* 12/2015 Kim .................. H04M 1/21
                                                455/575.8
2016/0072933 A1*  3/2016 Cox, III ............ H04M 1/185
                                                455/575.8

* cited by examiner

CARD-RECEPTIBLE SEMIAUTOMATIC SLIDE CASE FOR MOBILE PHONE

CROSS-REFERENCE TO RELATED APPLICATION

This application claims priority to Korean Utility model Application No. 20-2016-0003580 filed on Jun. 23, 2016 and all the benefits accruing therefrom under 35 U.S.C. §119, the contents of which are incorporated by reference in their entirety.

BACKGROUND

The present disclosure relates to a semiautomatic slide case for a mobile phone, which is capable of being semi-automatically slid by applying a slidable hook to a card-receptible mobile phone slide case to open and close a card receiving space.

Although mobile phones are being used in the past for communicating with persons through phone call, character transmission and reception, and the like, the mobile phones are being utilized in various fields due to innovative development of mobile phone-related technologies. Thus, mobile phones are in our daily lives as the needs of the men in the modern world, and thus, persons always carry mobile phones anytime and anywhere. Effects for improving convenience and portability by grafting mobile phones with products that are used in daily life are being variously attempted.

One of the various attempts may be a technology in which a card pocket and a mobile phone case are coupled to each other to perform a mobile phone case function and a card-receptible function.

According to the related art, a mobile phone case is manufactured in the form of a diary to form a diary-type card pocket (Prior Art 1) having a mobile phone protection function and a card-receptible function and a mobile phone case (Prior Art 2) in which a card receiving part is provided on a front surface of the mobile phone case, and a cover is detachable to receive a card.

SUMMARY

However, there are a limitation (Prior Art 1) in which there is an inconvenience when getting the phone, or the mobile phone is used for sending a text message, and a limitation (Prior Art 2) in which the mobile phone slide cover has to be separated when the card is used. Thus, the present disclosure provide a mobile case that is semi-automatically slidable and openable by applying a slidable hook to reduce an inconvenience in use of the functions of the mobile phone when the mobile phone case is attached and solve an annoyingness in which the slide cover of the mobile phone case has to be separated when the card is used.

In accordance with an exemplary embodiment, a mobile phone slide case that is capable of receiving a card includes: a main body formed of a buffer type material so that the main body is coupled to a rear surface of a mobile phone to protect the mobile phone; a frame case having a frame shape and detachably disposed on the main body; and a slide cover semi-automatically slid with a structure in which the slide cover is coupled to a slide coupling groove of the frame case and opened and closed.

The main body and the frame case may be integrated with each other without being separated from each other.

The main body may include: a mobile phone receiving part; and a card receiving part disposed on an opposite surface of the mobile phone receiving part, wherein a first coupling protrusion to which a sliding hook is coupled may be disposed on each of upper and lower portions of the card receiving part.

The frame case may include a slide cover receiving part corresponding to the card receiving part of the main body and to which the slide cover is attached.

The slide cover may include a sliding hook-type second coupling protrusion to which the sliding hook is coupled, and the slide cover may be connected to the main body through the sliding hook and semi-automatically opened and closed.

The sliding hook may include an elastic body having one end connected to the first coupling protrusion and the other end connected to the second coupling protrusion.

The sliding hook may include a first coupling pin and a second coupling pin, wherein the first coupling pin may include: a first spring; and a first coupling groove coupled to the sliding hook-type first coupling protrusion, and the second coupling pin may include: a second spring; and a second coupling groove coupled to the sliding hook-type second coupling protrusion.

The first and second coupling grooves may be defined in surfaces opposite to each other.

The first and second springs may be coupled to the sliding hook in a straight line shape, and one or more springs may be connected in parallel to each other.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
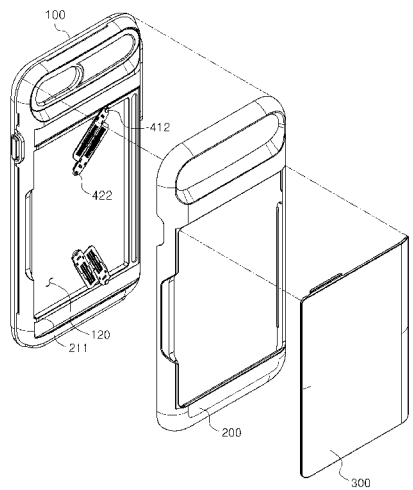
FIGS. 1 and 2 are views illustrating the whole configuration and a coupled state in accordance with an exemplary embodiment.

Hereinafter, specific embodiments of the present device will be described in detail with reference to the accompanying drawings in such a manner that the technical idea of the present device may easily be carried out by a person with ordinary skill in the art to which the device pertains. The present device may, however, be embodied in different forms and should not be construed as limited to the embodiments set forth herein. In the drawings, anything unnecessary for describing the present device will be omitted for clarity, and also like reference numerals in the drawings denote like elements.

In this specification below, when one part is referred to as being 'connected' to another part, it should be understood that the former can be 'directly connected' to the latter, or 'electrically connected' to the latter via an intervening part. Furthermore, when it is described that one comprises some elements, it should be understood that it may comprise only those elements, or it may comprise other elements as well as those elements if there is no specific limitation. In the present specification, "step of ~(ing)" or "step of" does not mean "step for".

Hereinafter, exemplary embodiments of the present disclosure will be described with reference to the accompanying drawings.

Figure 2:
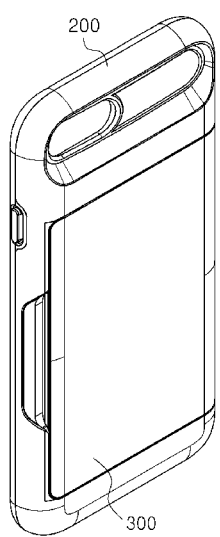

FIGS. 1 and 2 are views illustrating the whole configuration and a coupled state in accordance with an exemplary embodiment.

Referring to the drawings, the present device largely includes a main body 100, a frame case 200, and a slide cover 300.

The main body 100 is formed of a buffer type material to protect a mobile phone because the mobile phone is detachably coupled to a mobile phone receiving part 110.

The frame case 200 has a frame shape and is attached to and detachable from the main body 100.

Also, the main body 110 and the frame case 200 may be provided in one body without being separated from each other.

Figure 3:
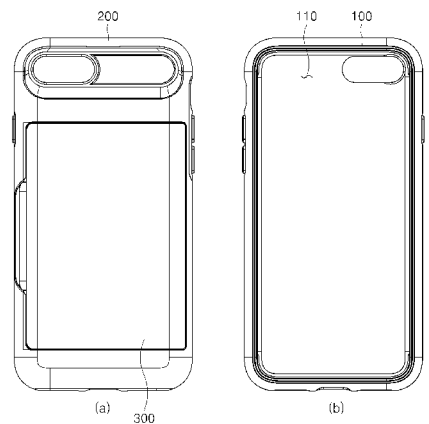
FIGS. 3 to 5 are views illustrating respective structures and operations in accordance with an exemplary embodiment.
Figure 4:
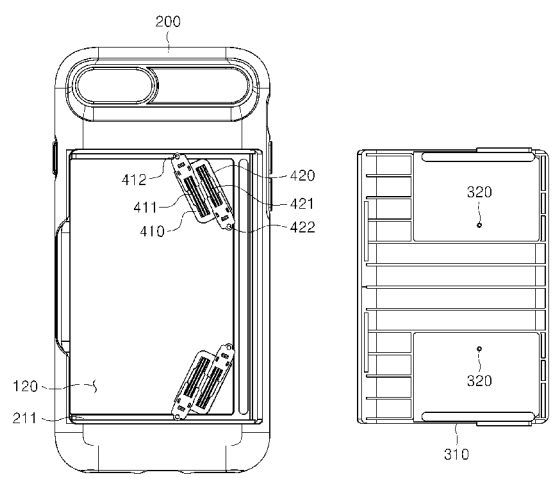
Figure 5:
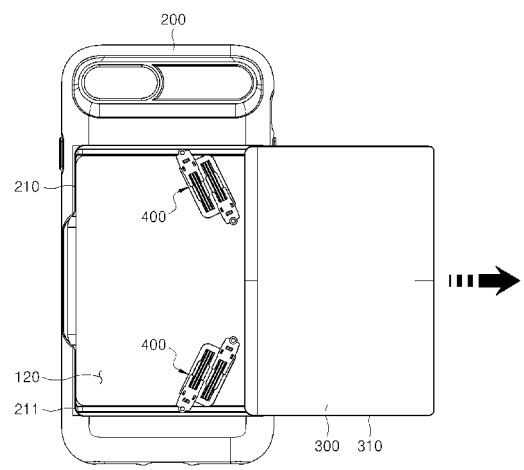

FIGS. 3 to 5 are views illustrating respective structures and operations in accordance with an exemplary embodiment.

The main body 100 has a structure that is attached to and detached from the mobile phone. The main body 100 has a front surface in which the mobile phone receiving part 110 coupled to a rear surface of the mobile phone is provided and a rear surface in which a card receiving part 120 for receiving and storing a card is provided. The main body 100 is formed of a buffer type material for protecting the mobile phone.

The frame case 200 has the frame shape. Also, the frame case 200 may have a structure that is detachably coupled to the rear surface of the main body 100 or a shape that is integrated with the main body 100 without being separated from the main body 100. The slide cover receiving part 210 of the frame case 200 may correspond to the card receiving part 120 of the main body 100. A slide coupling groove 211 is defined in each of upper and lower portions of the slide cover receiving part 210 so that the slide cover 300 is slidably coupled.

Also, a first coupling protrusion 212 may be disposed on each of upper and lower portions of the card receiving part 120 of the main body 100 and thus coupled to a first coupling groove 412 defined in a sliding hook-type first coupling pin 410.

A slide guide 310 coupled to the slide coupling groove 211 is disposed on each of upper and lower portions of the slide cover 300. The slide guide 310 may be formed of a material different from that of the frame case 200 to stably operate when being slidably coupled. The material may include a metal material.

Also, as illustrated in FIG. 4, two sliding hook-type second coupling protrusions 320 having shapes corresponding to each other may be disposed on inner upper and lower portions of the slide cover 300, respectively. Each of the second coupling protrusions 320 may be coupled to a second coupling groove 422 defined in a second coupling pin 420.

The sliding hook 400 has a shape in which the first coupling pin 410 and the second coupling pin 420 are connected to each other. The first coupling pin 410 includes a first spring 411 and a first coupling protrusion groove 412. The first spring 411 is coupled to be integrated with a center of the first coupling pin 410. The first coupling groove 412 may be coupled to the first coupling protrusion 212 disposed on the frame case 200 to allow the first coupling protrusion 212 to slidably operate.

The second coupling pin 420 includes a second spring 421 and a second coupling groove 422. Like the first coupling pin 410, the second spring 421 may be coupled to be integrated with a center of the second coupling pin 420. The second coupling groove 422 may be coupled to the second coupling protrusion 320 disposed on the slide cover 300 to allow the second coupling protrusion 320 to slidably operate.

The first coupling groove 412 is defined in a side opposite to the second coupling groove 422.

Also, in the sliding hook 400 in accordance with an exemplary embodiment, other elastic bodies such as rubber in addition to the spring may be used as the sliding hook 400.

In the above-described sliding hook 400, the sliding hook-type first coupling protrusion 212 may be coupled to the first coupling groove 412 defined in the first coupling pin 410, and the sliding hook-type second coupling protrusion may be coupled to the second coupling groove 412 defined in the second coupling pin 420. Thus, the slide cover 300 may semi-automatically slidably open and close the card receiving part 120.

Figure 6:
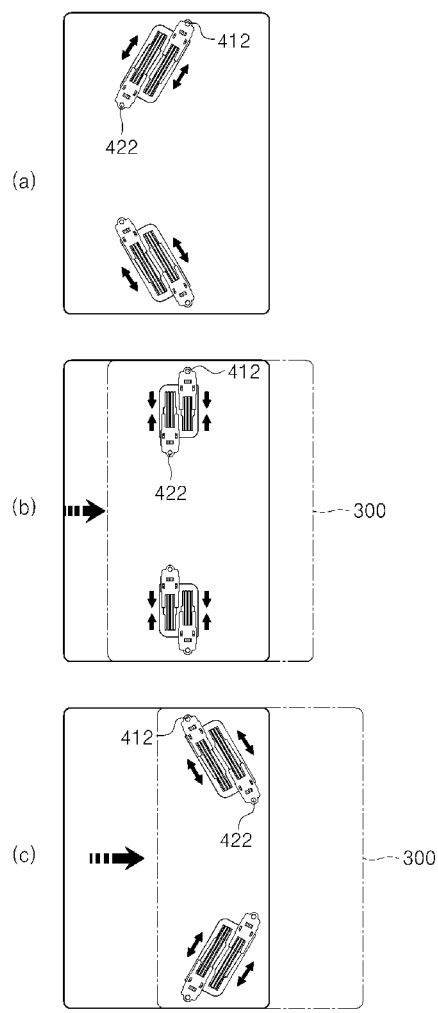
FIG. 6 is a view illustrating a process in which a slide cover is semi-automatically slidably opened and closed.

FIG. 6 is a view illustrating a process in which the slide cover is semi-automatically slidably opened and closed.

Referring to FIG. 6, (a) of FIG. 6 illustrates a state when the slide cover 300 fully covers the card receiving part 120 and a state when the second coupling groove 422 defined in the second coupling pin 420 and the sliding hook-type second coupling protrusion 320 are coupled to each other.

In (a) of FIG. 6, since the first coupling pin 410 and the second coupling pin 420 are slightly inclined to a left side, each of the first spring 411 and the second spring 421 is in a slightly extended state by elasticity of the spring.

(b) of FIG. 6 illustrates a state in which a user slightly pushes the slide cover.

When the user slightly pushes the slide cover, the second spring 421 of the second coupling pin 420 coupled to the sliding hook-type second coupling protrusion groove 320 is contracted while the slide cover 300 is slightly pushed, and also, the first spring 411 is contracted. Thus, each of the first coupling pin 410 and the second coupling pin 420 may have an inclination almost similar to a straight line.

(c) of FIG. 6 illustrates a process in which reaction force due to release of the first and second springs 411 and 421 being contracted in the process illustrated in (a) of FIG. 6 is generated when pushing force is applied somewhat to the slide cover 300.

When each of the first and second springs 411 and 421 is contracted somewhat, if slight pushing force is applied, the contracted springs may be extended at the same time to generate the reaction force. Thus, as illustrated in (c) of FIG. 6, the first and second springs 411 and 421 are extended in the state in which each of the first and second coupling pins 410 and 420 is slightly inclined to a right side.

Since the first coupling pin 410 and the second coupling pin 420 are coupled to be misaligned with each other, relatively large reaction force may be generated when the first and second springs 411 and 421 are contracted and then extended.

Figure 7:
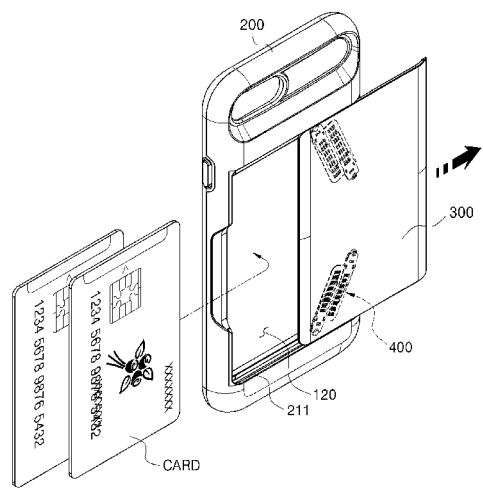
FIG. 7 is a view illustrating a method of use in accordance with an exemplary embodiment.

FIG. 7 is a view illustrating a state in which the card is received in the mobile phone case in accordance with an exemplary embodiment.

When the slide cover 300 is opened in a state in which the whole constituents of the present device are coupled to each other, the card receiving part 120 provided in the main body 100 may be confirmed.

Thus, the card desired by the user may be received and stored in the card receiving part 120. Also, since the main body 100 and the slide cover 300 are connected to each other through the coupling pin using the spring, the slide cover 300 may semi-automatically slidably open and close the card receiving part 120.

In accordance with the present disclosure, the semiautomatic sliding hook may be applied to the mobile phone case slide cover. Thus, the slide cover may be semi-automatically slid to open and close the card receiving part. Therefore, when the card is used, since the openable slide of the card receiving part is not separated, the annoyingness may be solved, and thus, the card may be more easily received.

Although the semiautomatic slide case for the mobile phone has been described with reference to the specific embodiments, it is not limited thereto. Therefore, it will be readily understood by those skilled in the art that various modifications and changes can be made thereto without departing from the spirit and scope of the present invention defined by the appended claims.

What is claimed is:

1. A mobile phone slide case capable of accommodating a card, the mobile phone slide case comprising:
   a main body coupled to a rear surface of a mobile phone, the main body comprising: a mobile phone accommodation part; and a card accommodation part disposed on an opposite surface of the mobile phone accommodation part;
   a frame case having a frame shape and detachably disposed on the main body, the frame case comprising: a slide cover accommodation part corresponding to the card accommodation part of the main body and to which the slide cover is attached; and a slide coupling groove to which the slide cover is coupled to allow the slide cover to slide; and
   a slide cover comprising: a slide guide coupled to a slide coupling groove; and a sliding hook-type second coupling protrusion to which a sliding hook is coupled,
   wherein the main body and the frame case are integrated with each other without being separated from each other, the slide cover and the main body are coupled to each other through the sliding hook having a first coupling pin and a second coupling pin, and
   wherein the slide guide is provided to each of the upper and lower portions of the slide cover, the slide guide being made of a metallic material.

2. The mobile phone slide case of claim 1, wherein a sliding hook-type first coupling protrusion to which the sliding hook is coupled is disposed on each of upper and lower portions of the card accommodation part,
   the first coupling pin of the sliding hook comprises: a first spring coupled to the sliding hook in a straight line shape and in which one or more springs are connected in parallel to each other; and a first coupling groove coupled to the sliding hook-type first coupling protrusion,
   the second coupling pin of the sliding hook comprises: a second spring coupled to the sliding hook in a straight line shape and in which one or more springs are connected in parallel to each other; and a second coupling groove coupled to the sliding hook-type second coupling protrusion,
   the first and second coupling grooves are respectively defined in surfaces opposite to each other.

3. The mobile phone slide case of claim 2, wherein the slide cover is configured to semi-automatically slidably open and close the card accommodation part through the connection between the sliding hook-type first coupling protrusion and the first coupling pin and between the sliding hook-type second coupling protrusion and the second coupling pin.

4. The mobile phone slide case of claim 3, wherein the frame case is formed of a material different than the slide guide.

5. The mobile phone slide case of claim 4, wherein the main body is formed of a buffer material.

\* \* \* \* \*